United States Patent
Hiremath

(10) Patent No.: US 8,537,999 B1
(45) Date of Patent: Sep. 17, 2013

(54) MANAGING PRECEDENCE CALL PREEMPTION IN A COMMUNICATION ENVIRONMENT

(75) Inventor: Chandrashekhar Hiremath, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 89 days.

(21) Appl. No.: 13/229,180

(22) Filed: Sep. 9, 2011

(51) Int. Cl.
*H04M 3/42* (2006.01)

(52) U.S. Cl.
USPC ................ 379/208.01; 379/211.01; 379/252

(58) Field of Classification Search
USPC ............................ 379/208.01, 211.01, 252
See application file for complete search history.

(56) References Cited

U.S. PATENT DOCUMENTS

| | | | |
|---|---|---|---|
| 6,771,765 B1 * | 8/2004 | Crowther et al. | 379/265.09 |
| 7,623,649 B2 | 11/2009 | Goldman et al. | |
| 7,912,079 B2 | 3/2011 | Rytina et al. | |
| 2005/0249196 A1 * | 11/2005 | Ansari et al. | 370/352 |

OTHER PUBLICATIONS

John R. Covert, "National Communications System Voice Precedence System Chart," *Official Global Autovon Telephone Directory* (1971), 2 pages.

* cited by examiner

*Primary Examiner* — Quynh Nguyen
(74) *Attorney, Agent, or Firm* — Patent Capital Group

(57) ABSTRACT

An attempt by a first endpoint device to establish a particular communication session with a second endpoint device is identified during a first, preexisting communication session between the second endpoint device and a third endpoint device. It is determined whether the first communication session has priority over the particular communication session. If the precedence level of the attempted particular communication session preempts the precedence level of the first communication session, the first communication session is terminated and the particular communication session is established between the first and second endpoints. A notification is provided to the third endpoint corresponding to the end of the particular communication session. Alternatively, if the first communication session has priority over the particular communication session, the attempt to establish the particular communication session is denied. A notification is provided to the first endpoint corresponding to the end of the first communication session.

18 Claims, 13 Drawing Sheets

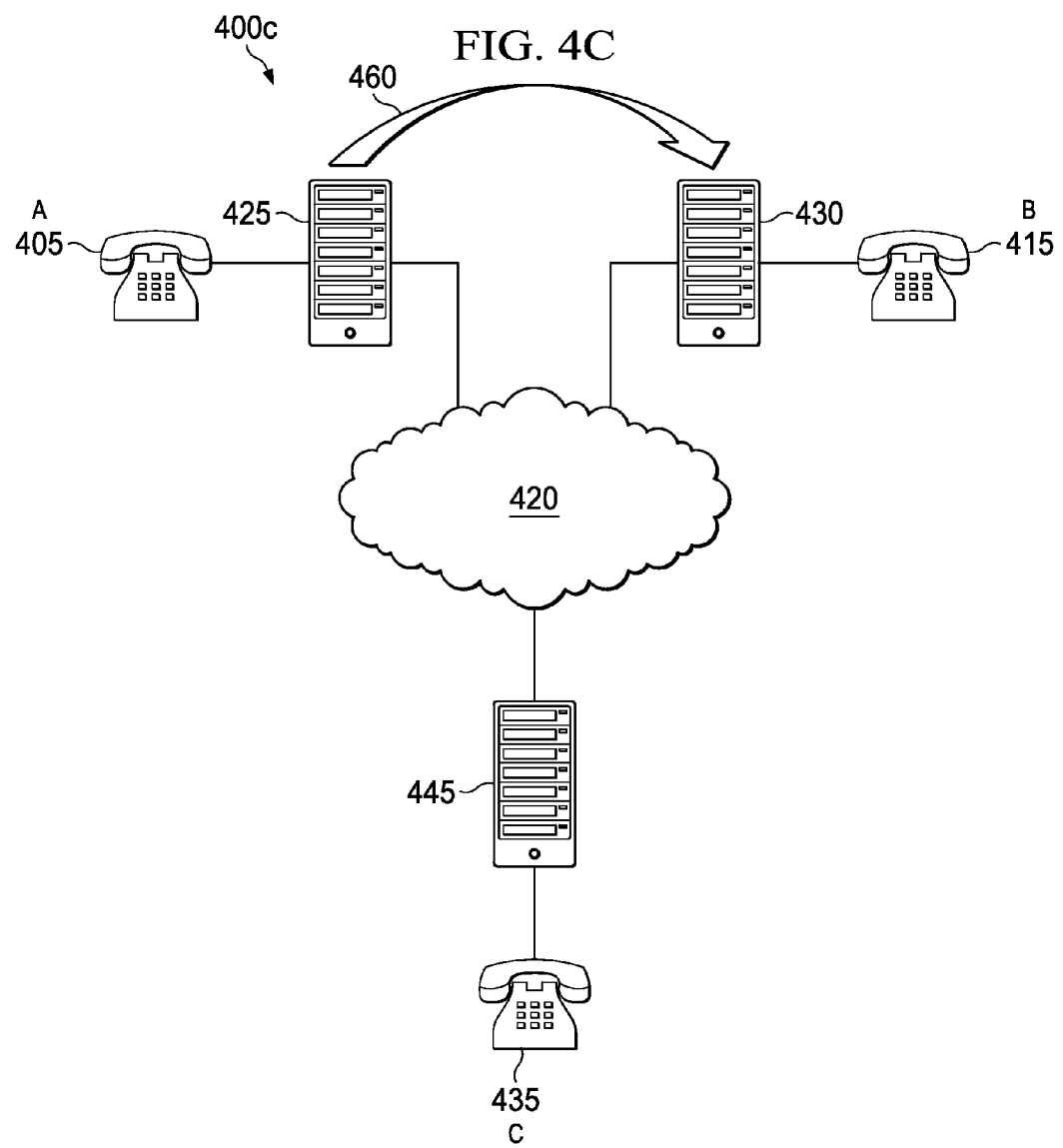

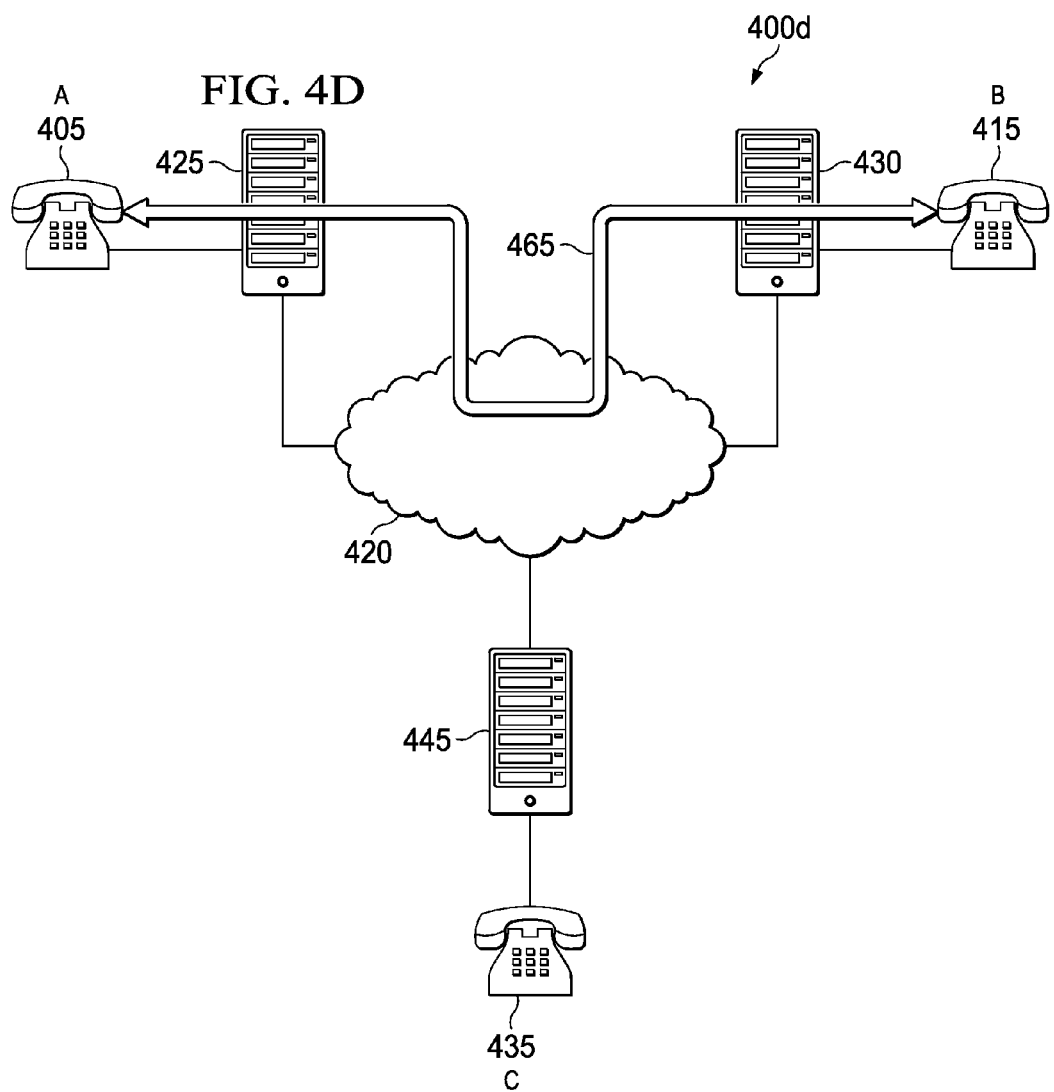

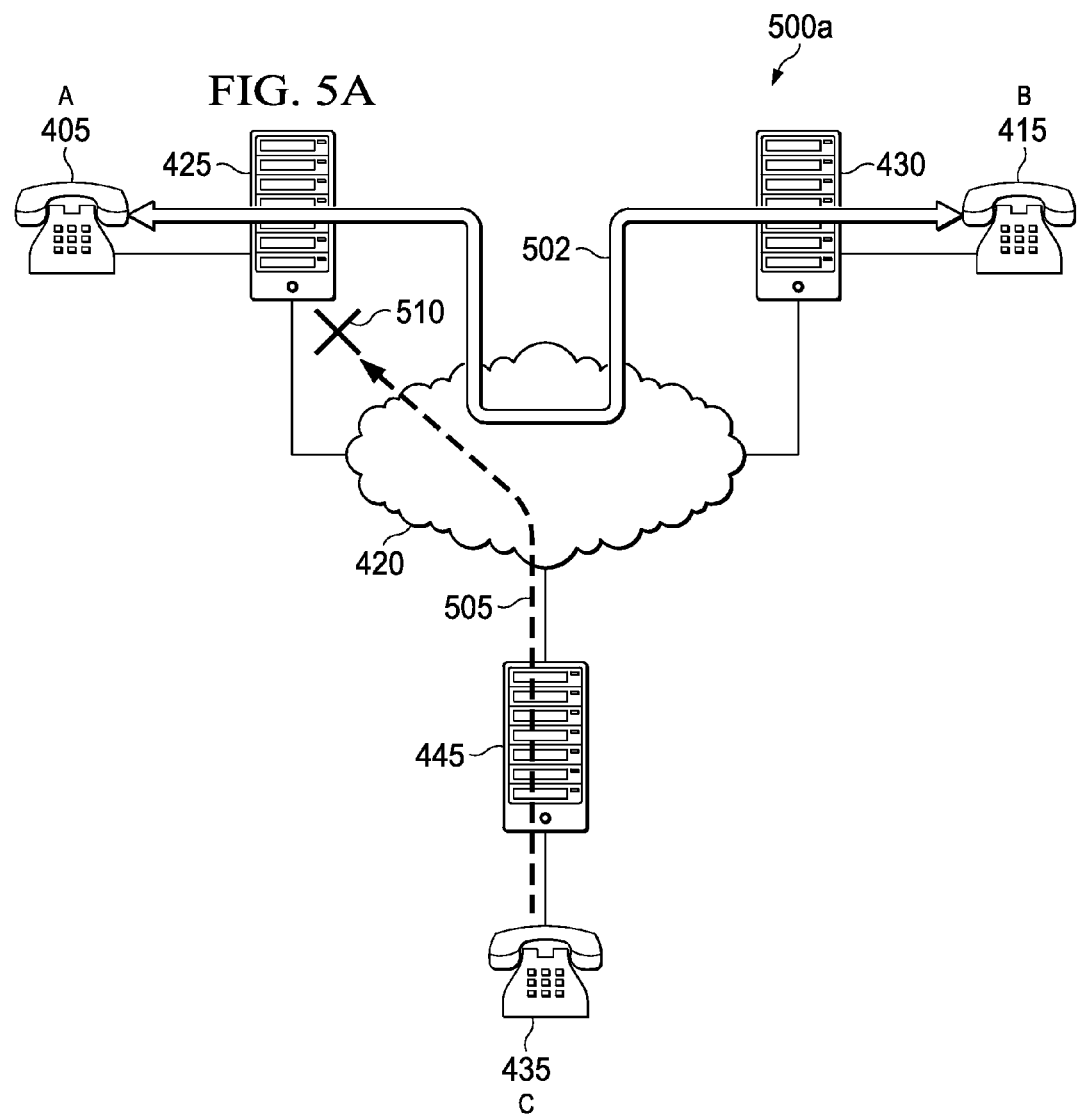

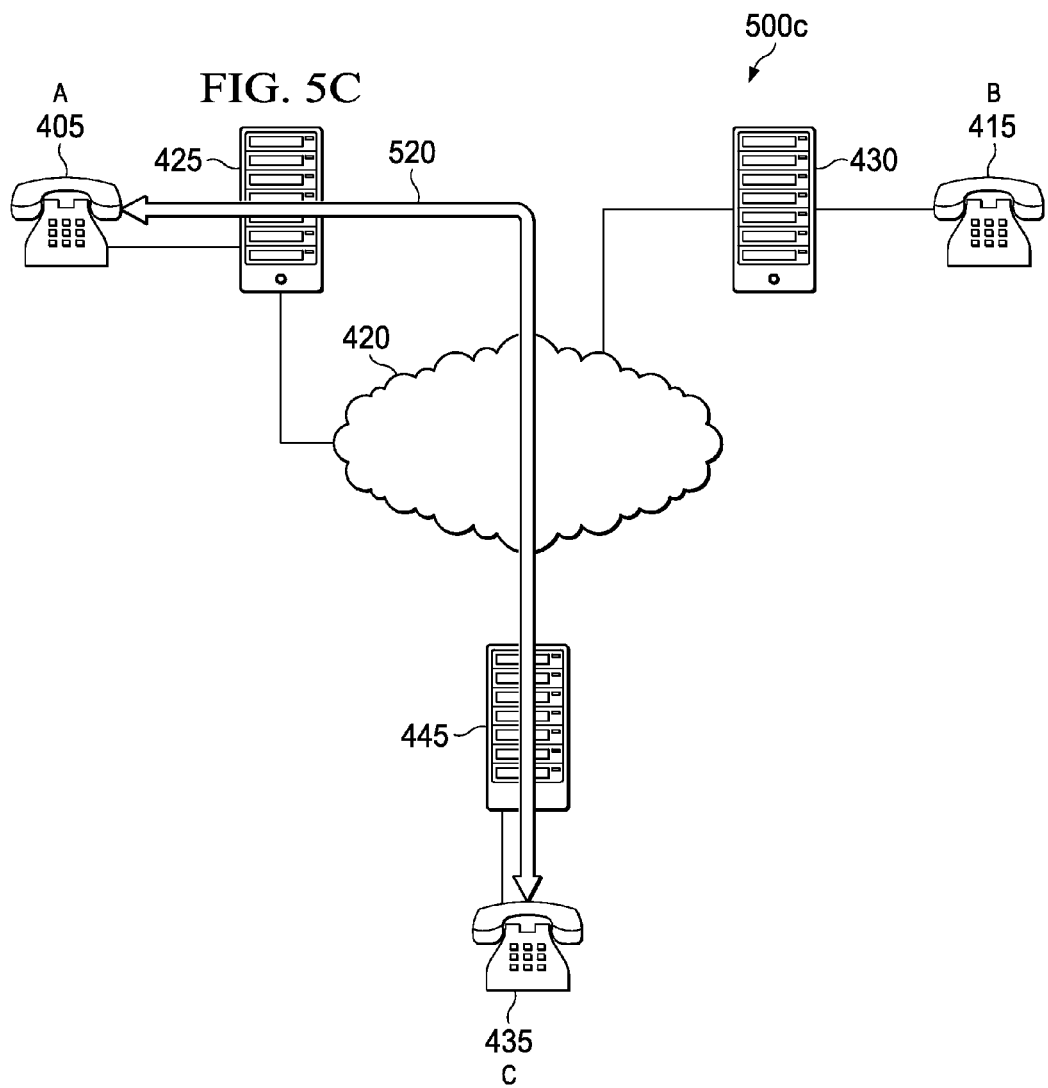

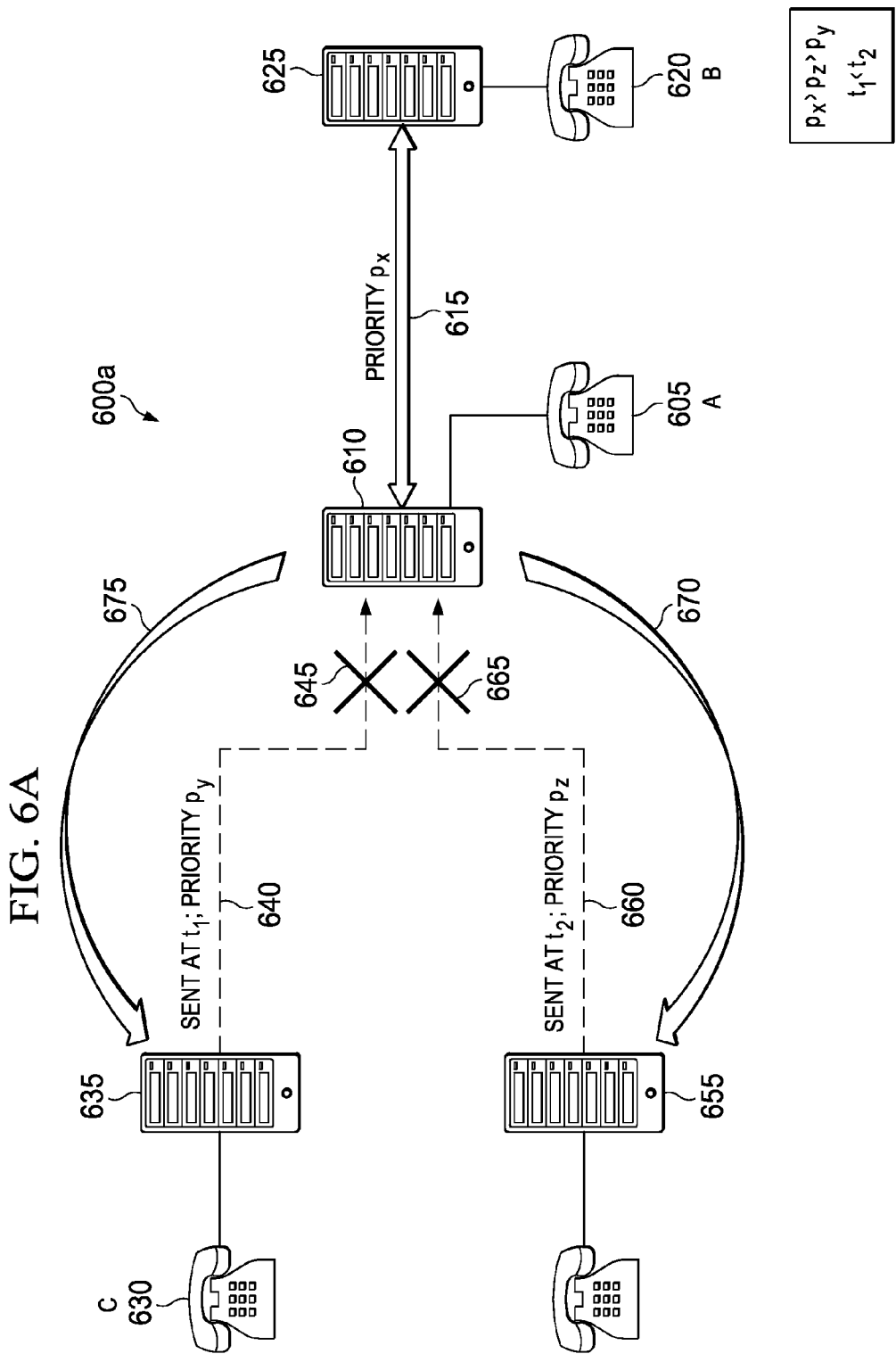

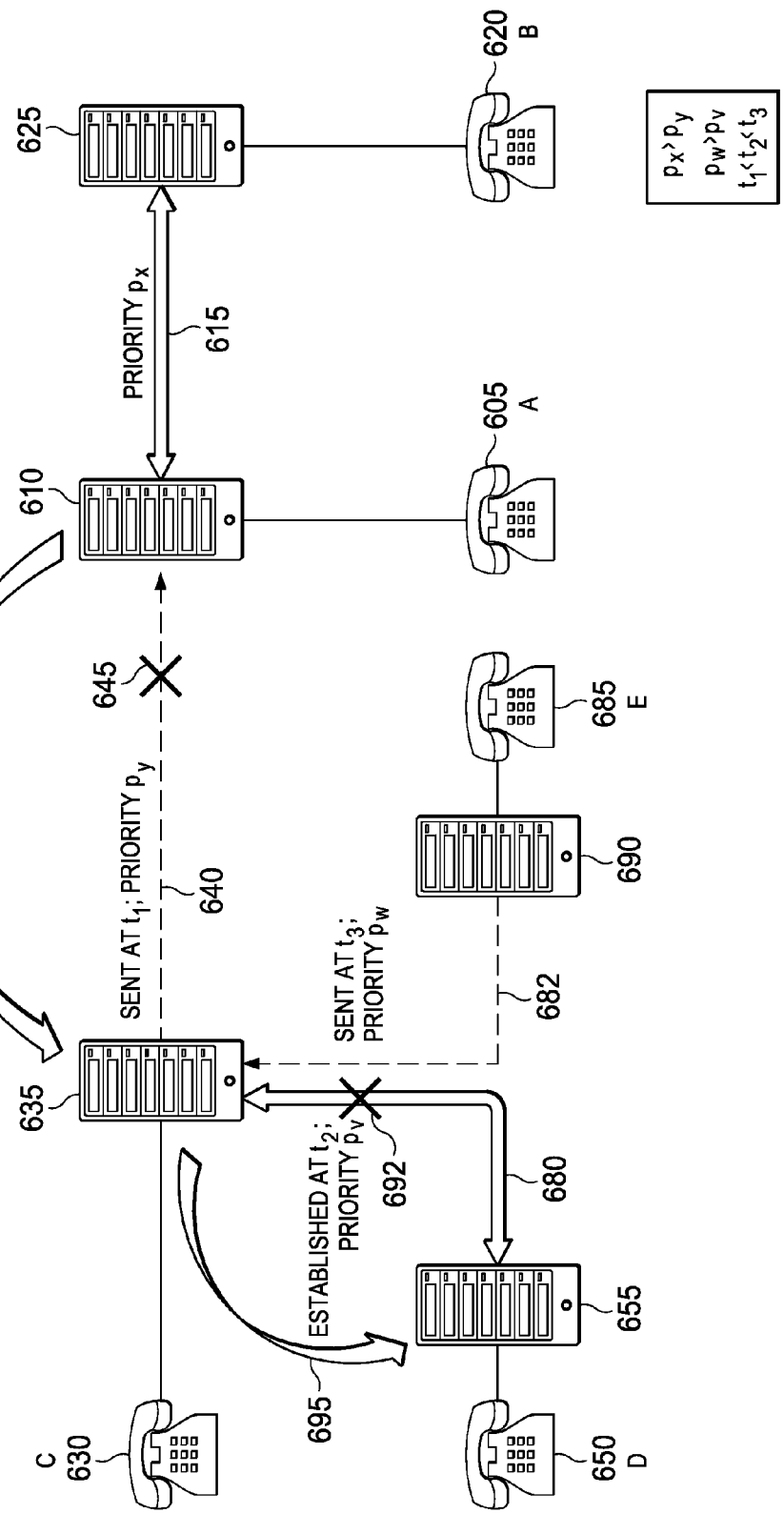

MANAGING PRECEDENCE CALL PREEMPTION IN A COMMUNICATION ENVIRONMENT

TECHNICAL FIELD

This disclosure relates in general to the field of communications, and more particularly, to managing a communication session priority scheme within a communication environment.

BACKGROUND

Priority schemes exist that assign precedence levels to particular calls and other communications sent over a communication network, allowing certain high-priority calls to preempt others in order to ensure bandwidth and clear communication lines for important types or sources of information. Multilevel Precedence and Preemption (MLPP) is one priority scheme that has been used to assign one of several precedence levels to a given communication or call. Calls with a higher precedence level can preempt others with lower precedence levels. Such priority schemes are often used within military and government communications, for instance, to allow high-ranking officials to preempt other lower-level communications so that especially important or urgent messages can be delivered to other officials. For example, the AUTOVON military phone system was equipped with call precedence processing allowing calls of increasing precedence to knock down, or preempt, calls of lower priority.

BRIEF DESCRIPTION OF THE DRAWINGS

FIG. 4A-4D illustrate one example of managing a preempted communication session in accordance with at least some embodiments;

FIGS. 5A-5C illustrate another example of managing a preempted communication session in accordance with at least some embodiments;

FIGS. 6A-6B illustrate examples of managing chains of preempted communication sessions in accordance with at least some embodiments.

Like reference numbers and designations in the various drawings indicate like elements.

DETAILED DESCRIPTION OF EXAMPLE EMBODIMENTS

Overview

Figure 1:
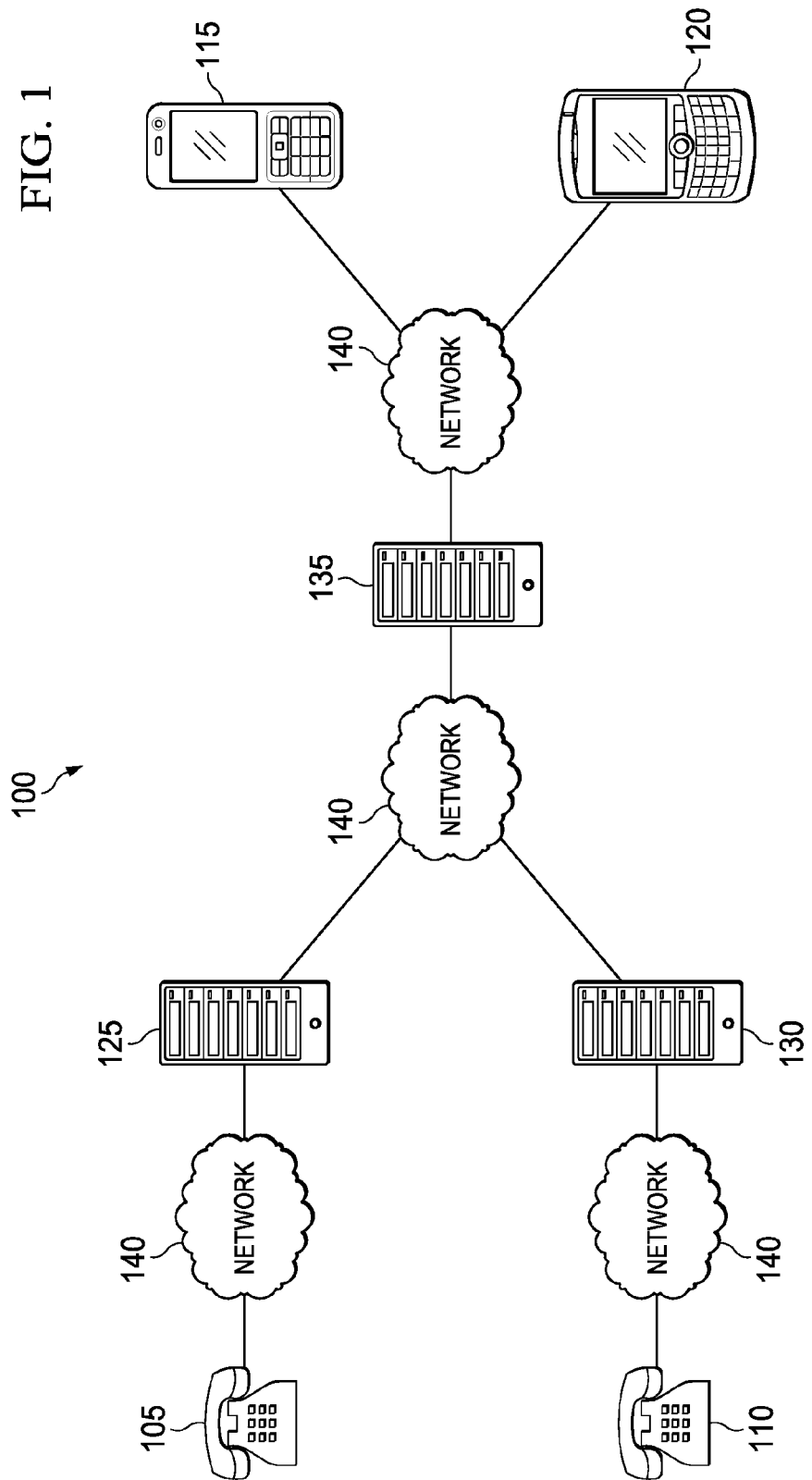
FIG. 1 is a simplified schematic diagram of a communication system for managing call preemption in accordance with one embodiment.

In general, one aspect of the subject matter described in this specification can be embodied in methods that include the actions of identifying an attempt by a first endpoint device to establish a particular telephonic communication session with a second endpoint device during a first, preexisting telephonic communication session between at least the second endpoint device and a third endpoint device. The precedence level of the attempted particular communication session can be compared with a precedence level of the preexisting first communication session. If the precedence level of the attempted particular communication session preempts the precedence level of the first communication session, the first communication session can be caused to be terminated and the particular communication session to be established between the first endpoint device and second endpoint device. A notification can then be provided to the third endpoint device that the particular communication session has ended. Alternatively, if it is determined that the second communication session has priority over the first communication session, the attempt to establish the first communication session can be denied. Further, a notification can be provided to the first endpoint device that the first communication session has ended.

In another general aspect of the subject matter described in this specification can be embodied in systems that include at least one processor device, at least one memory element, and a call manager. The call manager can be adapted to identify an attempt by a first endpoint device to establish a particular telephonic communication session with a second endpoint device during a first, preexisting telephonic communication session between at least the second endpoint device and a third endpoint device and determine that the first communication session has priority over the particular communication session. The attempt to establish the particular communication session can be denied based at least in part on the determination that the first communication session has priority. The call manager can be further adapted for use in providing a notification to the first endpoint device that the particular communication session has ended.

These and other embodiments can each optionally include one or more of the following features. The precedence level of the particular telephonic communication session can be compared with a precedence level of the first telephonic communication session to determine that the precedence level of the particular communication session is higher than the precedence level of the first communication session. Attempts to establish a new telephonic communication session during the particular communication session having a precedence level higher than the precedence level of the particular communication session can cause the particular communication session to be interrupted in favor of the new telephonic communication session. Attempts to establish a new telephonic communication session during the particular communication session having a precedence level substantially equivalent to the precedence level of the particular communication session can be denied. A precedence level of the first communication session can be determined. Determining a precedence level of the first communication session can include determining whether the first communication session has an assigned precedence level. The precedence level of the particular communication session can be a Multilevel Precedence and Preemption (MLPP) precedence level. The provided notification can include the sending of an SMS message to the third endpoint device, causing an audible notification to be presented on the third endpoint device, a voicemail accessible by the third endpoint device, or causing the attempted first communication session to be automatically established between the first endpoint device and third endpoint device upon conclusion of the particular communication session. The first communication session with the third endpoint device can be automatically initiated by the first endpoint device or by the third endpoint device. The provided notification can also include an option to automatically establish the attempted first communication session between the first endpoint device and third endpoint device.

Further, embodiments can each optionally include one or more of the following additional features. An attempt by a fourth endpoint device to establish a second telephonic communication session between the fourth endpoint device and the first endpoint device can be identified during the particular communication session. It can be determined that the particular communication session has priority over the second communication session. The attempt to establish the second communication session can be denied based at least in part on the determination that the particular communication session has priority. Priority between the attempted first communication session and attempted second communication session can be determined, and the notification can be provided to the second endpoint device based on the determined priority between the attempted first communication session and attempted second communication session. Priority between the attempted first communication session and attempted second communication session can be determined based at least in part on a comparison of precedence levels of the first and second communication sessions and a duration of time between the attempted first communication session and attempted second communication session. A call manager can be remote from each of the first, second, and third endpoint devices. An endpoint device can at least partially comprise the call manager.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

FIG. 1 shows a simplified schematic diagram illustrating an example communication system 100 for establishing a telephonic communication session between two or more participants in accordance with one example embodiment. In some implementations, communication system 100 can additionally be configured to permit the assigning of one or more precedence levels to calls according to one or more call priority schemes. Precedence levels can be recognized by the system to permit call preemption in certain instances, such as when the precedence level of one call indicates that the call takes priority over another. Additionally, preemption of calls according to a call precedence scheme can be managed to facilitate notification, and in some cases, automatic callback of a preempted communication session. In systems such as shown and described in FIG. 1 and elsewhere in this specification, benefits of a call priority scheme can be maintained while assisting in the revival of those communication sessions and communication attempts that have been interrupted by virtue of the priority scheme. Among other advantages, assisting in the revival of preempted communication sessions can enhance the user experience of system employing preemption priority schemes.

FIG. 1 shows a system 100 including two or more endpoint communication devices (e.g., 105, 110, 115, 120) capable of communicating with other endpoint devices over one or more networks (e.g., 140) through the use of one or more call managers 125, 130, 135. Endpoint devices 105, 110, 115, 120 can include wireline and wireless communication devices permitting users to engage in telephonic communications, such as telephones, VOIP terminals, cellular telephone devices, AUTOVON terminals, smartphones, personal, laptop, or tablet computing devices, TelePresence systems and terminals, and teleconference systems and terminals, among other such endpoint devices and systems permitting participation in telephonic communications. Communication sessions can be established over one or more networks 140, including public switched telephone networks (PSTN), integrated services digital networks (ISDN), cellular and mobile networks, the Internet, intranets, VOIP networks, military communication networks (such as AUTOVON), government communication networks, and other public and private communication networks using various communication technologies.

One or more call managers (e.g., 125, 130, 135) can be used to establish and manage communication sessions between two or more endpoint devices (e.g., 105, 110, 115, 120). In some instances, a communication session can be established and/or managed using distinct call managers associated with, or otherwise operating in connection with, each endpoint participating in the communication session. In other instances, a common call manager (e.g., 135) can be used to handle call management activities for two or more endpoints (e.g., 115, 120) participating in the same call. Call managers, in some implementations, can include or be implemented in connection with unified call managers, VOIP or mobile gateways, telephone exchanges, or other devices, modules, or systems for use in connecting an endpoint device to a communication network and telephonic communication sessions established using the communication network. In some implementations, software and/or hardware implementing a call manager can be at least partially included within the endpoint device itself.

In addition to establishing and terminating communications between endpoints, call managers can be used to handle and facilitate call preemption and other call priority scheme tasks. In some instances, endpoint devices capable of initiating and/or participating in calls with precedence level assigned according to a particular priority scheme can use a preemption-enabled call manager to initiate or participate in such calls. A preemption-enabled call manager can detect precedence level messaging, data, or information sent with or otherwise identifiable in connection with a particular communication, including a call request. Further, preemption-enabled call managers can identify the precedence level of an existing communication facilitated or maintained, at least in part using the call manager, as well as the precedence levels of calls directed through the call manager to endpoint devices of the call manager. Pre-emption enabled call managers can compare the precedence level of an existing call involving a particular endpoint device and incoming calls for the particular endpoint device and initiate preemption actions based on the comparison. For instance, if a particular endpoint device participates with another endpoint device in a first communication session having a first precedence level, and a second intervening call with a higher precedence level is received during the first communication session that is intended for the particular endpoint device, the call manager can be used to preempt and terminate the first communication in favor of the higher-priority call. The call manager can then be used to connect the particular endpoint device to the second call. Alternatively, if the intervening call has a lower precedence level than the first, existing call, the intervening call can be preempted by denying the call.

While traditional priority call protocols and schemes can be useful in preempting lower-priority calls in favor of higher-priority calls, traditional priority schemes ignore the user experience of the user that has been preempted in favor of another higher-priority caller. While the preempting call may be objectively more important or of higher priority within a certain scheme, the preempted user may nonetheless value the preempted call that is dismissed according to the priority scheme. Among other advantages and in accordance with the teachings of the present disclosure, communication system 100 can be configured to overcome these shortcomings (and others) in providing a notification, to the preempted user, that the preempting call has ended and that an opportunity may exist to recommence the preempted call.

Figure 2:
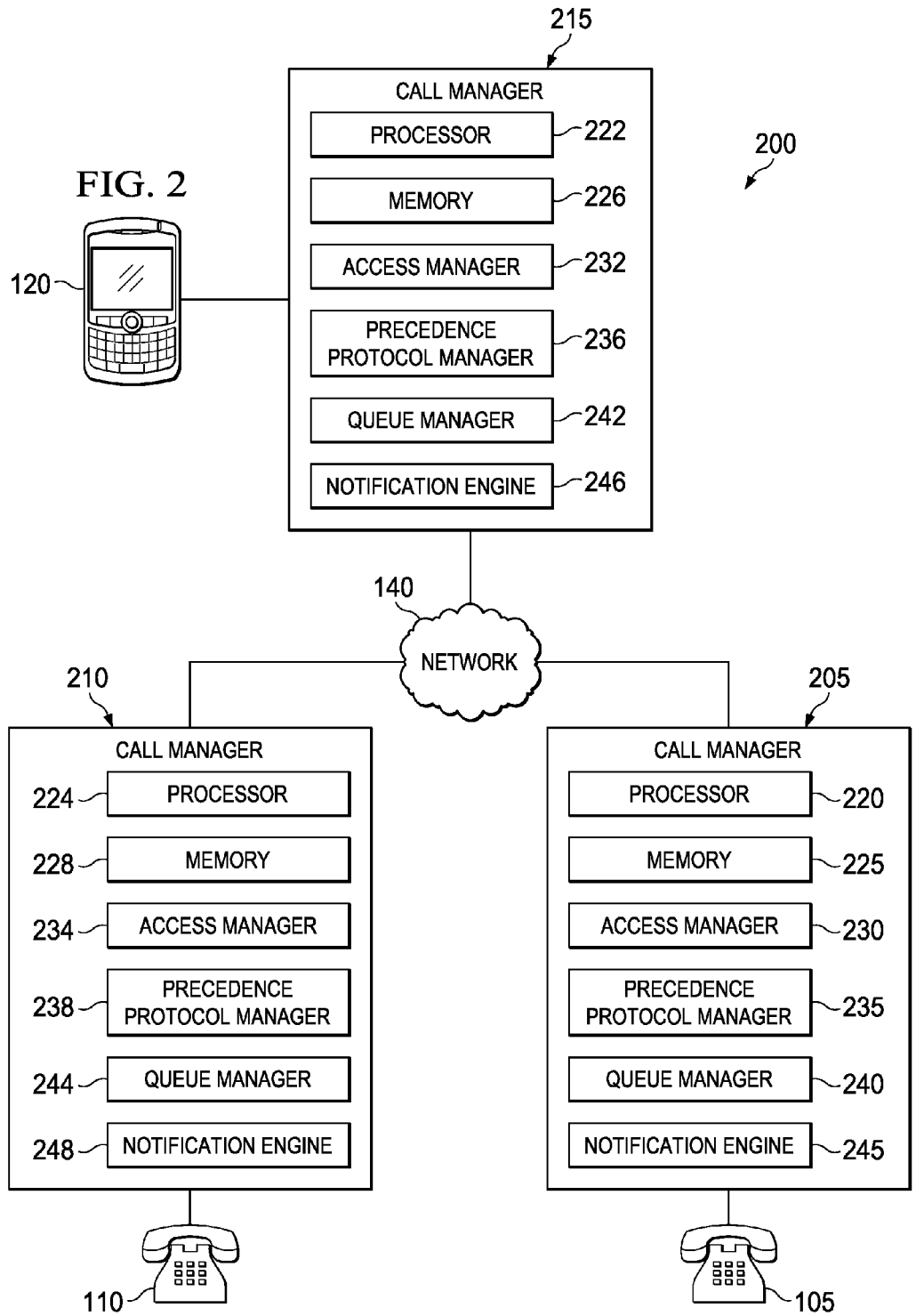
FIG. 2 is a simplified block diagram of an example communication system enabling management of call preemption in accordance with one embodiment.

FIG. 2 illustrates a simplified block diagram 200 of an example communication system enabling management of call preemptions within one or more particular call priority schemes. Call preemption management can include notifying preempted users of the end of the preempting call including, in some instances, automatically recommencing the preempted telephone call upon conclusion of the preempting call. In the particular non-limiting example shown in FIG. 2, call manager modules 205, 210, 215 can be used by telephonic endpoint devices (e.g., 105, 110, 120) to join telephonic communication sessions and each include or use one or more processor devices (e.g., 220, 222, 224) and one or more computer-readable storage devices (e.g., 225, 226, 228). In this example, a call manager (e.g., 205, 210, 215) can include an access manager (e.g., 230, 232, 234), precedence protocol manager (e.g., 235, 236, 238), queue manager (e.g., 240, 242, 244), and notification engine (e.g., 245, 246, 248) among other tools, modules, and utilities, such as voicemail, caller ID, call waiting, and other modules and functionality.

A call manager access manager (e.g., 230, 232, 234) can be used to connect or disconnect one or more different endpoint devices to communication sessions with other, remote endpoint devices over one or more networks (e.g., 140). The access manager 230, 232, 234 can additionally be used in connection with a precedence protocol manager 235, 236, 238 configured to receive, interpret, assign, and forward precedence level information for phone calls made or maintained over the call manager 205, 210, 215. For instance, precedence level information can be included in messaging to another endpoint or call manager, in connection with an attempt to initiate a communication session with the other endpoint. Such precedence level information can be assigned to a call automatically, according to particular pre-established rules or preferences, or may be assigned to the call by the user placing the call. The precedence protocol manager 235, 236, 238 can also be used to identify the precedence level of incoming calls and determine whether an incoming call should be preempted by or preempt another, existing telephone call or session. The precedence levels of existing communication session can also be identified using a precedence protocol manager 235, 236, 238. Further, in some implementations, precedence protocol managers 235, 236, 238 can be used to notify endpoint devices that a call has been preempted based on a particular priority scheme. For instance, data can be sent from a precedence protocol manager 235, 236, 238 to a corresponding endpoint device indicating that a call involving the corresponding endpoint device was interrupted, denied, terminated, or otherwise preempted in favor of a higher-priority call according to a call priority scheme. Indeed, in some examples, data can indicate to the endpoint device the precedence level of the preempting call. In either instance, endpoint devices can use data describing conditions of a preemption event in order to convey such information to a user of the device, for example, through an audio or graphical user interface of the endpoint device.

Figure 3:
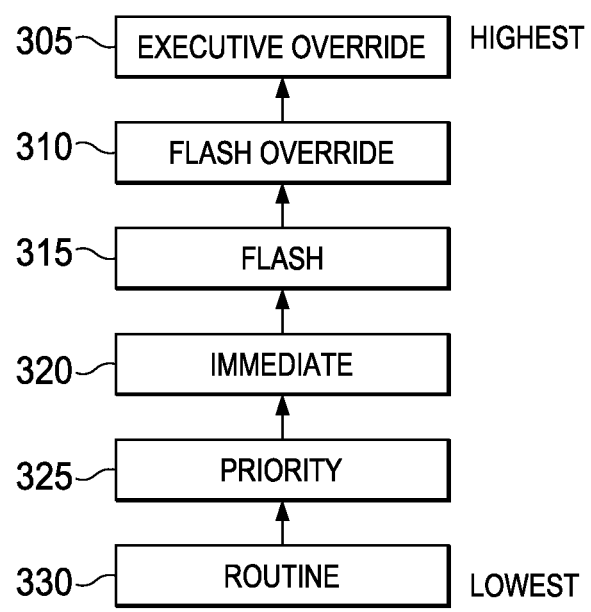
FIG. 3 is a representation of example precedence levels in an example system multi-level precedence scheme.

In some implementations, call managers (and corresponding precedence protocol managers) can be configured to manage one or more different priority schemes. In some examples, a single call manager can be configured to handle a plurality of different priority schemes. Priority schemes can adopt various protocols and rules, including multi-precedence level schemes, such as MLPP. Turning to FIG. 3, a diagram is shown illustrating an example multi-precedence level priority scheme. In this particular scheme, calls with a precedence level 305 of "Executive Override" would have highest priority, preempting any existing calls conflicting with an Executive Override call's use of the network. Four other precedence levels 310, 315, 320, 325 can also be assigned to calls in this example scheme. Further, calls that are not assigned a precedence level, or are not enabled or configured to have a precedence level assigned, can also be assigned a default "Routine" precedence level 330 that would be preempted by any call having one of the other, higher precedence levels (e.g., 305, 310, 315, 320, 325) assigned to it. In some instances, an example priority scheme can include just two precedence levels, one being high-priority the other being routine or low priority. Some example priority schemes can consider other characteristics of a call in addition to the assigned precedence level, when determining whether a call should be preempted. For instance, the order in which calls were initiated, the time the calls were initiated, the network, end user, or type of endpoint device from which the call originated or with which the call was involved can all be considered, among other examples. In addition, two calls with the same assigned precedence level involving at least one common endpoint device can conflict. Call characteristics other than the assigned precedence level can be considered, for example, to "break a tie" between calls having the same assigned precedence level, among other examples.

Returning to FIG. 2, in some instances, multiple attempts to establish a call with a particular endpoint device can be received while the particular endpoint device is engaged in another, established call. A queue of the received calls can be generated and maintained by a call manager 205, 210, 215, for instance, using a queue manager 240, 242, 244. Further, in some implementations, a queue manager 240, 242, 244 can be used to calculate an order for the queue in order to determine how and with what priority notifications should be sent to preempted endpoint devices alerting the endpoint devices that the particular endpoint device is available or initiating an automatic callback to the particular endpoint device, among other examples and tasks.

A notification engine 245, 246, 248 can also be provided in connection with a call manager module (e.g., 205, 206, 208), configured to generate and manage the sending or forwarding of notifications to preempted endpoint devices to assist in establishing or re-establishing a preempted call. Notifications can include alerts sent to the preempted endpoint device notifying the user of the preempted device that the preempting call has ended. For example, an email can be sent to an email inbox associated with the endpoint device, an SMS or other text-based message can be sent to the endpoint device, a pre-recorded or dynamically generated voicemail or other audio message can be sent to the preempted endpoint or a voicemail inbox associated with the endpoint device, particular graphical or audio sequences, patterns, etc. can be presented on the endpoint device indicating that the preempted call may be able to be established, among other examples communicating the availability of another endpoint involved in an ended preempting call. In some examples, a notification can include an automated callback attempt, causing an attempt to be made automatically to establish or re-establish the preempted call once it is identified that the other endpoint device(s) involved in the preempted call are available or that one or more preempting calls have ended. In some instances, a call-back attempt can be made automatically, initiated by either the preempted endpoint device, or endpoint devices involved in the preempting call, immediately following the termination of the preempting call. In some examples, a notification can be sent (e.g., text message, email, etc.) with a selectable link or object for initiating an attempt to establish a preempted call. In some example implementations, a notification can include the automated scheduling and communication of an alternative time for resuming or beginning a preempted call (i.e., following the termination of the preempting call). Indeed, a notification can include the automated scheduling of a call-back appointment that can be sent to each of the devices involved in (or intended to be involved in) the preempted call, the call-back appointment identifying a time for reconvening the preempted call, as well as, in some instances, links, buttons, or other controls for initiating or joining the scheduled call.

Figure 4A:
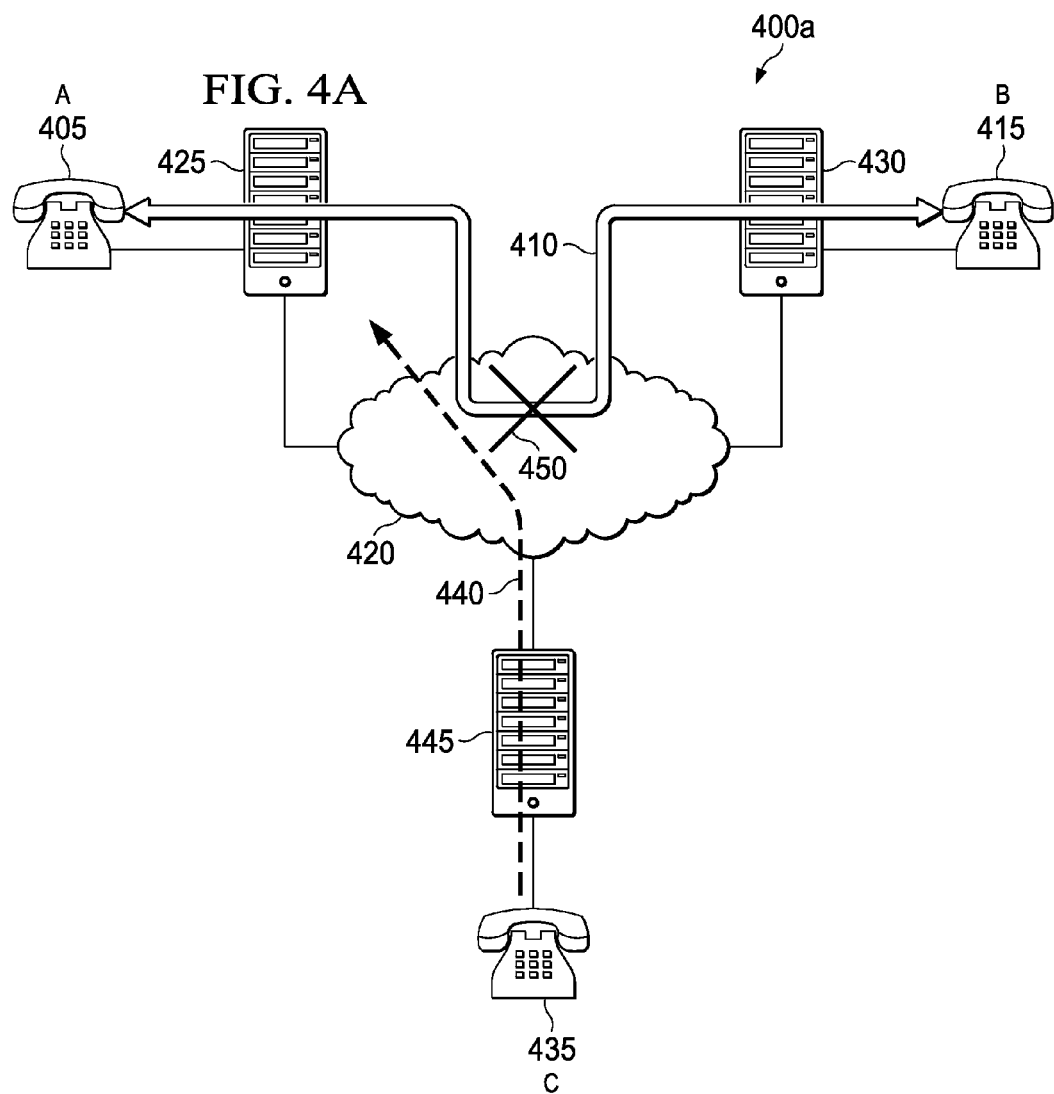

Turning now to FIGS. 4A-4D, schematic representations 400a-d of a first example are shown of tasks and actions that can be performed in connection with the manager of a priority preemption scheme. In FIG. 4A, a first telephone endpoint device A (405) is engaged in a telephone call 410 with a second telephone endpoint device B (415) over a network 420. In this example, call managers 425, 430 are engaged in facilitating the communication session (e.g., call 410) between telephones A and B respectively. While telephones A and B are engaged in telephone call 410, a third device, telephone endpoint C (435) attempts 440 to have telephone A (405) join telephone C in a distinct telephonic communication session (or "phone call"). In this particular example, telephone C can place 440 the new call with the assistance of a call manager (e.g., 445). In the example of FIG. 4A, telephone C attempts 440 to place a call with a precedence level higher than the precedence level of existing telephone call 410. For example, the user of telephone C 435 may specify a particular precedence level for the call in connection with dialing or otherwise contacting telephone A. In other instances, calls sent from certain devices or in association with particular users or accounts can automatically be assigned a particular precedence level. In accordance with a particular priority protocol, telephone C's higher-priority call attempt 440 preempts the existing, lower-priority call 410 between telephones A and B. Accordingly, in this particular example, the call 410 between telephones A and B is terminated 450 in response to the call attempt 440 from telephone C.

Figure 4B:
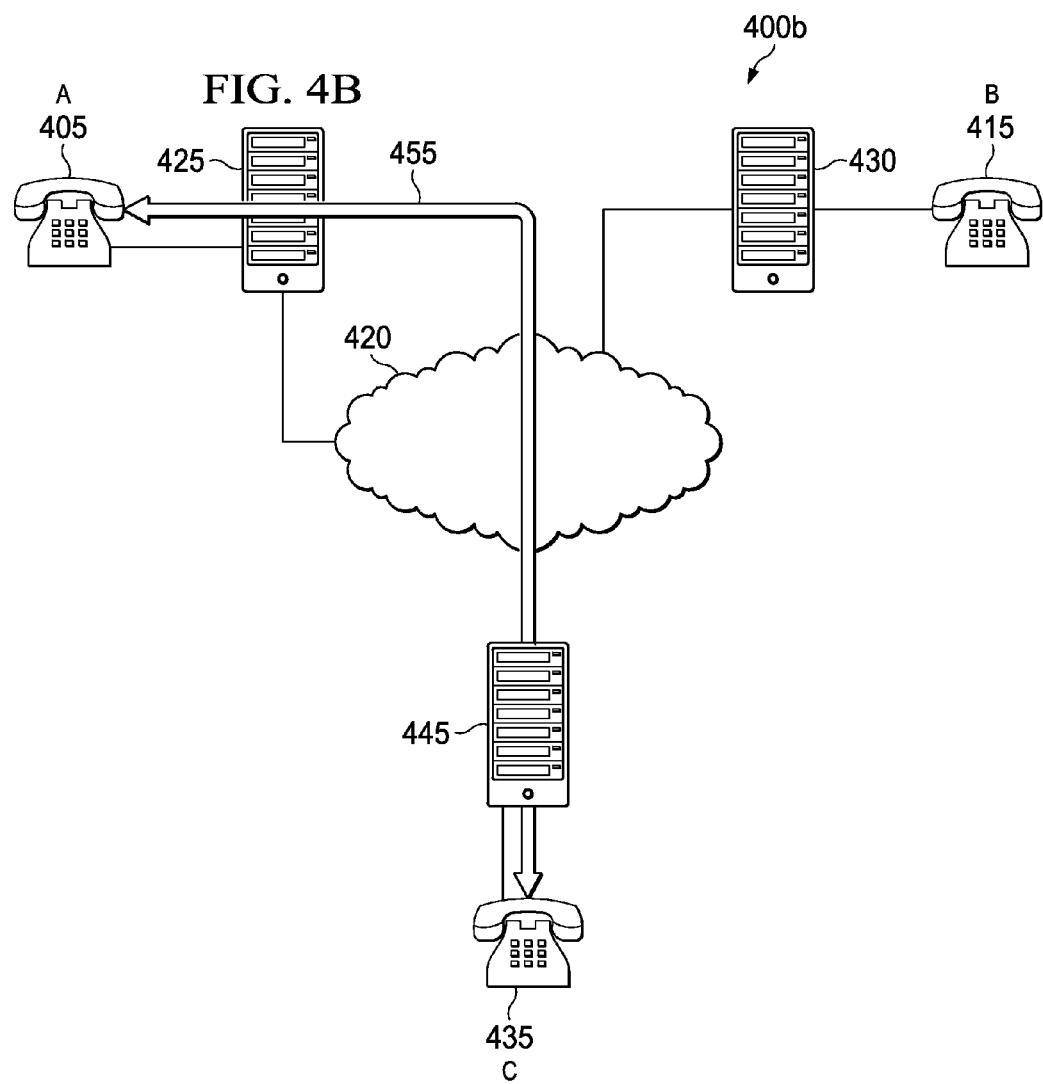

Upon terminating lower-priority call 410 between telephones A and B, telephone C's attempt 440, in this particular example, is successfully connected thereby joining telephones A and C in the higher-priority call 455, as shown in FIG. 4B. In some implementations, call managers 425, 430, 445 can be used to facilitate, at least in part, the management of the priority-based preemption event. As one example, the call manager 445 used in connection with telephone C's call attempt 440, can identify a precedence level for the call and send data, in-band or out-of-band with the call attempt 440, to a call manager 435 associated with the called telephone (i.e., 405) identifying the call attempt as having an associated precedence level. The call manager 435 of the called telephone A can identify the precedence level of the incoming call 440, identify the precedence level of the existing call 410 and determine whether the existing call or incoming call should be preempted. In the example of FIGS. 4A-4B, it is recognized that the precedence level of the incoming call 440 is higher than the precedence level of the existing call, and a preemption event can be triggered, and in some cases, coordinated between the call manager of the called (405) and calling (435) telephone devices. For instance, call manager 425, associated with the called telephone A 405, can make a precedence level comparison and preemption determination and pass this information to the call manager 445 of the calling telephone C. The two call managers 425, 445 can then coordinate the corresponding preemption event, by either terminating an existing call (e.g., 410) with a third device (e.g., 415) and establishing the call between telephone A and C, or denying telephone C's call (i.e., in instances where the incoming call's 440 precedence level is not higher in priority than the precedence level of the existing call 410). In other instances, the call manager of the called device (e.g., 405) can manage the preemption event on its own, determining that preemption should be initiated based on a particular priority scheme, initiating new preempting calls, initiating the termination of preempted calls, blocking lower-priority incoming calls, etc. The called device's call manager can also, optionally, communicate to other affected endpoint devices and/or corresponding call managers that a preemption event has occurred as well as the basis of the preemption event.

In addition to facilitating preemption events, call managers can also be used to notify preempted endpoints of opportunities to establish or re-establish a preempted call. As shown in the example of FIG. 4C, a notification 460 can be sent to the endpoint device 415 on the other end of the preempted call 410, thereby assisting the preempted device 415 in later re-establishing a call 465 with telephone A after the preempting call 455 has been completed, as shown in FIG. 4D. As noted above, a wide array of notification types and techniques can be implemented and employed to assist in establishing the new call in an attempt to accommodate preempted users. The form, timing, and type of a notification can also be based, at least in part, on notification preference data received from a user of the preempted device before the preemption event, immediately following the preemption event, or while the preempted device waits for a notification. In some instances, a notification can be sent after, and in response to, the conclusion of the preempting call 455. In other instances and implementations of a notification 460, the notification need not be sent after or in response to the conclusion of the preempting call 455, for instance, in implementations where the notification designates or identifies the scheduling of a particular future time or appointment for attempting to re-contact telephone A.

In some examples, call manager 425 can initiate the notification 460, for example, sending data or other information to the preempted device 415 (or call manager 430) that can be further rendered or processed either by the preempted telephone, call manager, or another device or module to prepare the notification for presentation at the endpoint device 415. In some instances, the preempted call manager can receive notification that the preempting call has ended triggering the generation of notification data at the preempted call manager 430 that can be presented at the endpoint device. In still other examples, other devices, including remote and online server devices, can additionally be used and communicated with to facilitate the delivery of notifications 460. For example, other devices and servers, including third-party systems, can be used in connection with the generation and delivery of notifications to preempted devices, such as an email server, web-based notification service, voicemail server, among other examples. Accordingly, in such examples, a call manager initiating a notification can communicate with other computing devices, such as a remote server, to facilitate the generation and/or delivery of a particular notification type. Additionally, notifications can be sent or copied to devices other than the actual preempted endpoint device, such as a personal computing device associated with the preempted telephone or user account.

Further, in implementations where the notification includes the automated re-establishing of the preempted call (e.g., call 410 between telephones A and B), a call manager of one of the devices originally involved in the preempted call (e.g., either call manager 425 or 430) can initiate a new call to telephone B after the conclusion of the preempting call, allow the users of the telephones A and B to resume their call. For instance, the call manager of the device included in the pre-empting call (e.g., call manager 425) can identify the end of the preempting call and immediately attempt to reestablish the preempted call 410 or communicate to the preempted device's call manager (e.g., 430) the option to automatically reestablish the call (e.g., if the preempted device (e.g., 415) is available to reestablish the call). The above are but a few of the several non-limiting examples and implementations of notifications that can be provided to assist in facilitating the establishment of a preempted call following a preempting call's conclusion. Other notification types, content, and delivery techniques can also be employed and be within the scope of this disclosure.

Figure 5B:
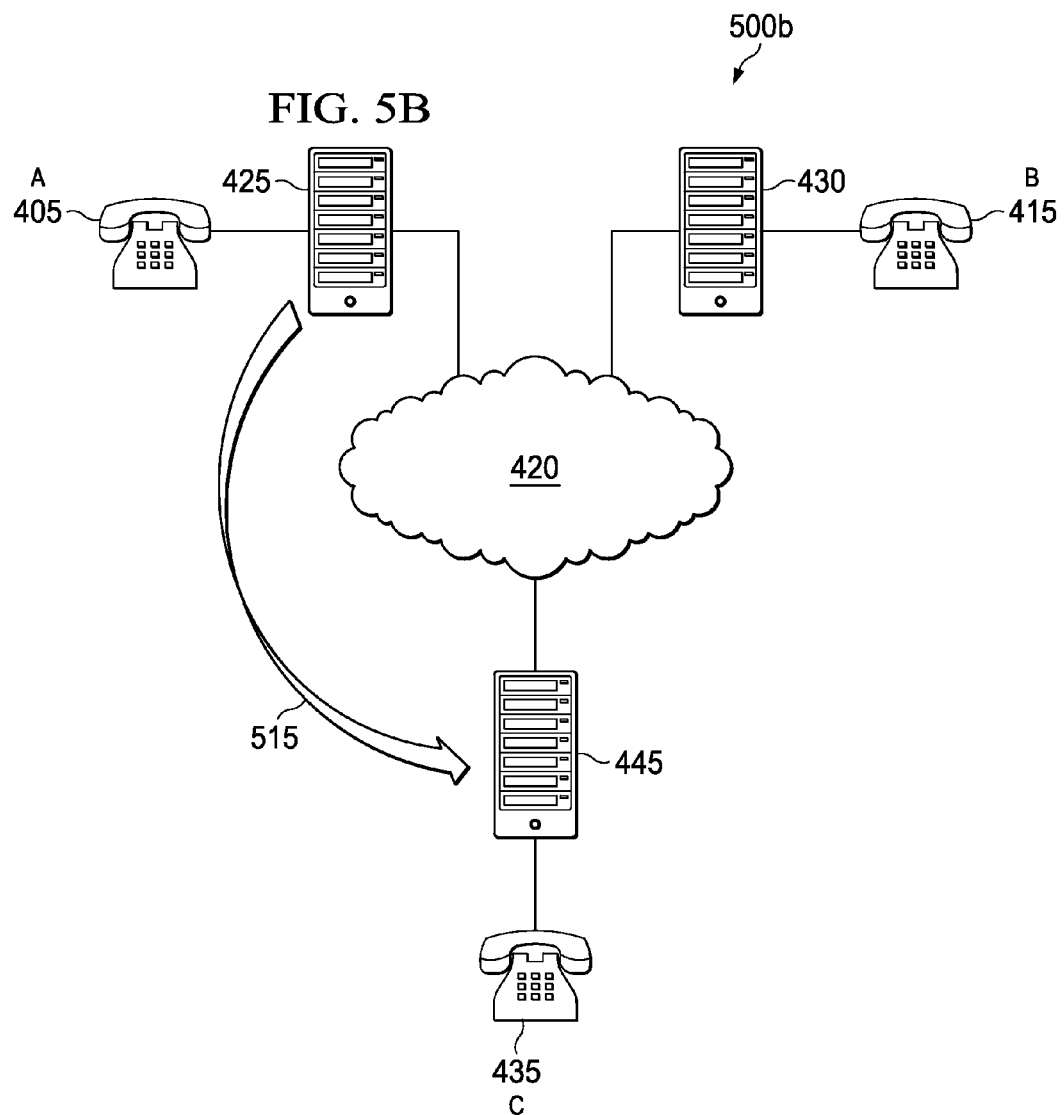

In the examples of FIGS. 4A-4D, an example preemption event was triggered by an intervening call (440) with a higher priority (and precedence level) than an existing call 410. As noted above, in some instances, a preemption event can alternatively include the denial of a lower-priority incoming call when a higher-priority call is already in progress. For instance, as shown in the example of FIGS. 5A-5C, telephones A and B can be engaged in a telephone call 502 assigned a particular precedence level when an attempt 505 is made by a third telephone C to connect to telephone A. It can be determined, for example, by call manager 425, that the precedence level of the incoming call 505 is of a lower priority level than the precedence level of the existing phone call 502. As a result, telephone C's attempt 505 to call telephone A is preempted by the existing higher-priority call and denied 510. Further, telephone C can optionally be presented with an indication that the call's denial 510 resulted from a priority preemption rather than another type of non-priority-based denials, such as standard busy line (e.g., indicated by a traditional busy tone or other cue). For instance, a distinct tone, or other audio and/or visual cue can be presented to the preempted user indicating a priority-based call preemption. After the preemption event (e.g., 510) the preempting call 502 can be monitored to identify when the call 502 is completed and terminated on the network. In connection with the termination of the preempting call, as in the examples of FIGS. 4A-4D, a notification 515 can be communicated to the preempted telephone indicating conditions for establishing the desire call 505 between telephones A and C, as shown in FIG. 5B. Further, as shown in FIG. 5C, the notification 515 can be used to assist in a communication session 520 being established between telephones A and C following the termination of call 502.

As in the examples of FIGS. 4A-4D, in preemption events involving the denial of incoming call, such as shown in the examples of FIGS. 5A-5C, the notification communicated to the preempted device can take a number of forms and may be communicated over various combinations of call managers, servers, and other devices. The notification can be presented at the preempted device audibly or visually, and in some implementations, include the automatic initiation of the preempted call (i.e., upon detection of the end of the preempting call), thereby identifying to the preempted device (e.g., 435) that the preempting call (e.g., 402) has ended and that the called telephone (e.g., 405) is available for a call.

Turning to the examples of FIGS. 6A-6B, in some instances, a chain of preemption events can occur resulting in a plurality of notification messages associated with the conclusion of each of the preempting phone calls involved in the chain of preemption events. In schematic 600a of FIG. 6A, a first example is shown illustrating a first telephone 605, using call manager 610, engaged in a telephone communication session 615 with a second telephone B 620 (e.g., using call manager 625). During the call 615, at time $t_1$, a third telephone C 630 (e.g., using call manager 635) can attempt 640 to call telephone A. The attempted call 640, in this example, has a precedence level $p_y$ of a lower priority than the precedence level $p_x$ of the preexisting established call 615, resulting in the attempted call 640 being preempted and denied 645. Following the first preempted call 640, at time $t_2$, a fourth telephone D 650 (using call manager 655) can also attempt 660 to dial telephone A 605 while telephone A 605 is connected to telephone B 615 in call 615. This second attempted call 660 also has a precedence level (i.e., $p_z$) of a lower priority than the precedence level (i.e., $p_x$) of the first call 615 and is therefore also preempted and denied 665).

In the example of FIG. 6A and others involving a chain of calls or call attempts (e.g., 615, 640, 660), determining, coordinating, and sending notifications to preempted devices can involve additional calculations and processing. For instance, in the example of FIG. 6A, while call 640 was received at $t_1$ before the call 660 at $t_2$, the second preempted call attempt 660 has a higher priority precedence level $p_z$ than the precedence level $p_y$ of the first-preempted call. In some priority schemes, had the first preempted (or received) call (e.g., 640) had a higher priority precedence level than other subsequent calls preempted by the same preexisting call (e.g., call 615), determining an order, precedence, or otherwise coordinating the sending of notifications to the preempted devices could be quite straightforward, for instance, allowing the first preempted and highest-priority preempted call to be assisted in connecting to the telephone A before the other preempted calls.

Orchestrating the sending of notifications in a chain of preempted calls can become more complex in other instances. In one example, because the precedence level $p_z$ of the later-received preempted call 660 is higher than other preempted calls, a notification 670 can be sent that assists telephone D in connecting to telephone A prior to telephone C, following the termination of call 615. For instance, in some implementations, once the first call 615 has concluded, a notification 670 can be sent to telephone D alerting telephone D that telephone A is now available for a call. A subsequent notification 675 can be sent to telephone C once telephone A's call with telephone D has ended. In some instances, when telephone D 650 receives notification 670, telephone D (or its user) may not be available to engage in a call with telephone A. For instance, a busy signal can be detected at telephone D or user data can be received indicating that the user is unable to take the call at or near the time the notification 670 is received at the device 650. In such examples, call managers of devices involved in a chain of preemption events can coordinate the availability of the respective devices, and consider and work around device availability when sending and processing notifications. For instance, while telephone D's notification 670 may normally preempt the notification 675 to telephone C, if it is determined that telephone D is unavailable and/or that telephone C is available for a call, a notification 675 can be sent to telephone C alerting telephone C of telephone A's availability prior to telephone D being assisted with the completion of its preempted call with telephone A. By considering endpoint devices' availability while facilitating callback arrangements for preempted calls, network resources can be more efficiently used.

In other examples, a priority scheme may consider both the precedence levels, as well as the time of preemption of a chain of preempted calls. As an example, while the precedence level $p_z$ of the later-received preempted call 660 may be higher than the precedence level $p_y$ of the first preempted call 640, the fact that call preempted call 640 was received first may outweigh the higher precedence of the later-received call 660. For instance, in some instances, a priority scheme may employ an algorithm that attempts to balance a preempted device's wait time (i.e., time between preemption and the resumption of the preempted call) with the relative difference in priority between a set of preempted calls. For instance, in one example, if the second preempted call 660 has a precedence level $p_z$ slightly higher than the precedence level $p_y$ of the first-preempted call 640, but the first preempted call was preempted a significant amount of time before the later call 660 was received, a priority scheme algorithm may result in the determination that notification 675 be sent to telephone C to facilitate telephone C's call with telephone A, before telephone D's is assisted with its call with telephone A. If the time between preempted calls is less significant, however, notifications 670, 675 may be generated and sent, as in the previous example, to facilitate the connection of the higher-priority preempted call first. Other factors beyond precedence level and time of preemption can also be considered and weighed against the respective precedence levels of other calls in a chain of preempted calls, according to various priority scheme algorithms. For instance, certain endpoint devices, call managers, networks, users, accounts, etc. can be preferred over others and influence the order and under what conditions certain preempted calls will be assisted (i.e., through notifications) in being established.

FIG. 6B illustrates another example of a chain of preemption events introducing additional considerations in facilitating the establishing or reestablishing of preempted calls in a chain. For instance, as in the example of FIG. 6A, a call 640 from a third device (telephone C 630), received during a pre-existing call 615, can be preempted 625 based on a determination that the precedence level $p_x$ of the pre-existing call 615 is higher than that (i.e., $p_y$) of the new call attempt 640. While telephone C 630 awaits a notification (e.g., 675) that telephone A is available, telephone C may receive other calls, such as a call 680 from telephone D 650 as well as other subsequent calls, such as from a fifth device (e.g., telephone E 685 using call manager 690). Other combinations of conflicting communication sessions and requests to establish communication sessions of varying precedence levels can occur. Indeed, the examples herein described are simplified examples for purposes of illustration, and one can appreciate the number of different scenarios and preemption chains that can develop among more complex, real-world communication networks, such as systems including thousands and millions of endpoint devices and calls potentially affected by one or more priority schemes. For instance, in the particular example of FIG. 6B, telephone C establishes (at $t_2$) a call 680 with telephone D having a precedence level $p_v$ while call 615 is still connected. However, while call 680 is connected, telephone C 630 receives another call 682, at $t_3$ from telephone E (685), with a higher precedence level $p_w$ than the prior connected call 680, thereby causing the call 680 between telephones C and D to be preempted and interrupted 692 in favor of a call between telephones C and E.

The example chains of preemption events illustrated in FIGS. 6A and 6B can result in the generation and/or management of a notification queue to coordinate the sending of a plurality notifications corresponding to the preemptions, thereby indicating opportunities to establish the preempted calls. For instance, in the example of FIG. 6B, a notification 675 can be sent to telephone C 630 in connection with the termination 645 of call 615, while another notification 695 can be sent to telephone D relating to the termination 692 of call 680. Other preemptions may also occur, resulting in additional notifications not explicitly illustrated. For instance, if telephone A become available to establish preempted call 640 with telephone C, an active preempting call at telephone C (e.g., call 682) may itself be preempted by the notification 675 that telephone A is available (e.g., if the precedence level $p_x$ of the preempted call 640 is higher than the precedence level $p_w$ of call 682). In this sense, a notification can itself act to preempt an active call, including notifications that include automatically initiated attempts to establish another preempted call. Alternatively, a notification 675 can be delayed pending the end of an intervening call active at telephone C (e.g., call 682), such that the notification 675 does not interrupt the call, such as when the precedence level (e.g., $p_w$) of a call (e.g., 682) is higher or equal in priority to the call (e.g., 640) that the notification (e.g., 675) is to assist in establishing. Further, in other implementations, to assist in simplifying the coordination of notification messages corresponding to various preemption events in a chain, a priority scheme may dictate that endpoint devices that have been preempted and are awaiting notification of the availability of their preempted call may be temporarily blocked from making their own or participating in other higher-precedence level calls that potentially create additional links in a preemption chain. All such information used to queue, track, block, or otherwise manage preemption events, preempted calls, and notifications can be stored and maintained in one or more data stores or structures, managed, for instance, by one or more distinct call managers and/or centralized queue managers servicing and coordinating multiple call managers, among other examples.

In some instances, managing a queue of preemption events, preempted calls, and/or availability notifications can additionally include messaging and other communication between two or more call managers negotiating or coordinating preemption events involving multiple different endpoints. For example, a notification 675 can be generated and sent relating to the end of a preempting call 615 at least partially through call manager 610. Further, notification 695 can be generated and sent using call manager 635 relating to the reestablishment of call 692. In addition, coordinating when and how such notifications (and others) are generated and delivered, as well as the content and form of such notifications can involve messaging and coordination between at least the call managers (610, 635) of telephones C and A, among potentially other call managers, such as call managers involved in other preempting or preempted calls included in or affected by a corresponding preemption chain, such as the call managers (655, 690) of telephones D and E.

It should be noted and appreciated that the examples illustrated above in FIGS. 1-6B are non-limiting, simplified examples provided for illustrative purposes only. Real world systems can be substantially more complex than those illustrated above, as well as the algorithms and schemes employed in implementations managing priority scheme preemptions within modern communication environments, all while employing principles illustrated above. Indeed, various combinations of components, techniques, systems, and subsystems illustrated above can be implemented to achieve similar results according to the disclosure above, and within the scope of this specification.

Figure 7:
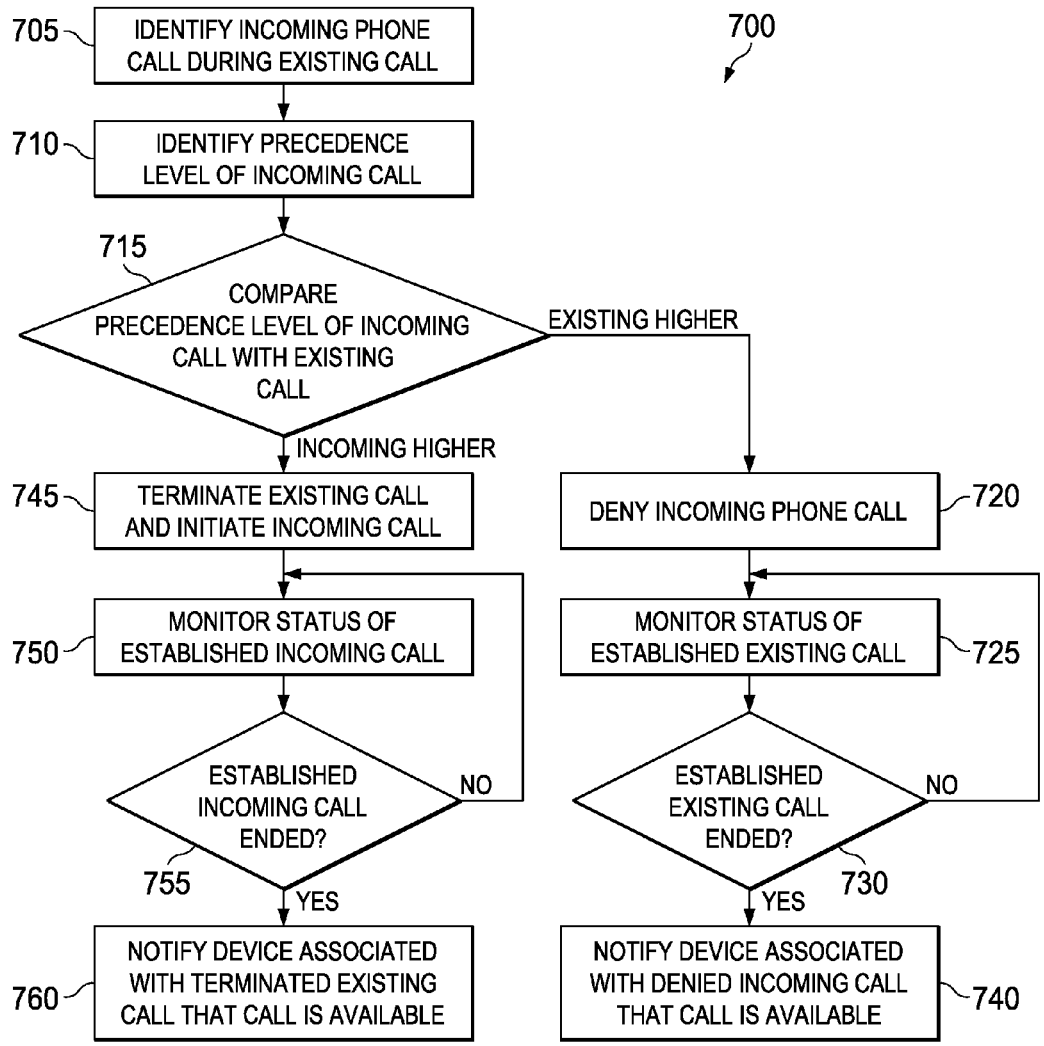
FIG. 7 is a simplified flowchart illustrating example operations associated with at least some embodiments of the communication system.

FIG. 7 is a simplified flowchart 700 illustrating an example technique for assisting in initiating a preempted telephonic communication session in connection with the end of a corresponding preempting telephonic communication session. An incoming phone call can be identified 705 during an existing phone call. One or both of the incoming and existing calls can have an assigned precedence level in accordance within one or more particular telephone call priority schemes. The precedence level of the incoming call can be identified 710. The lack of a pre-assigned precedence level can nonetheless qualify as a precedence level within certain priority schemes, being identified as a "routine," "unassigned," "normal," "default," or other such precedence level designation. The precedence level of the incoming call can be compared against the precedence level of the existing call to see if a priority scheme should be invoked and/or a preemption event triggered. For instance, if it is identified that the precedence level of the existing call is higher than (or, in some schemes, higher than or substantially equal to) the identified precedence level of the incoming call, then the incoming phone call be denied 720. Alternatively, if the precedence level of the incoming call is of a higher priority than the precedence level of the existing call, the existing call can be terminated in favor of the incoming call (i.e., 745).

In instances where the incoming call has been denied 720 and preempted by a higher-priority, existing call, the status of the established call can be monitored 725 to determine when the call has ended 730. If it is identified that the established call has ended, a device associated with the incoming call can be notified 740 that the preempting existing call has ended. In some instances, such a notification can be sent 740 (or at 760) prior to establishing that the existing call has ended (e.g., as in steps 735, 730).

In instances where the incoming call forces the termination 745 of an existing call based on a determination 715 that the precedence level of the incoming call is higher than the existing call, the status of the newly established intervening call can be monitored 750 to identify 755 when the intervening call ends. Further, a device associated with the terminated call that was dropped in response to the intervening call can be notified 760 of the end of the intervening call, assisting in the reestablishment of the terminated call.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Telephonic communication sessions can include the user of various network environments including various network elements. As used herein, "network element" is meant to encompass various types of routers, switches, gateways, bridges, loadbalancers, firewalls, servers, inline service nodes, proxies, processors, modules, or any other suitable device, component, element, or object operable to exchange information in a network environment. The network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices that are used by the user.

Although the present disclosure has been described in detail with reference to particular embodiments, it should be understood that various other changes, substitutions, and alterations may be made hereto without departing from the spirit and scope of the present disclosure. For example, although the present disclosure has been described as operating in conferencing environments or arrangements, the present disclosure may be used in any communications environment that could benefit from such technology. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
   identifying an attempt by a first endpoint device to establish a particular telephonic communication session with a second endpoint device during a first, preexisting telephonic communication session between at least the second endpoint device and a third endpoint device;
   determining, by the second endpoint which includes a call manager, that the first communication session has priority over the particular communication session, wherein the attempt to establish the particular communication session is denied based at least in part on the determination that the first communication session has priority;
   providing a notification to the first endpoint device that the particular communication session has ended; and
   comparing a precedence level of the particular telephonic communication session with a precedence level of the first telephonic communication session, wherein the precedence level of the particular communication session is higher than the precedence level of the first communication session.

2. The method of claim 1, wherein attempts to establish a new telephonic communication session during the particular communication session having a precedence level higher than the precedence level of the particular communication session cause the particular communication session to be interrupted in favor of the new telephonic communication session.

3. The method of claim 1, wherein attempts to establish a new telephonic communication session during the particular communication session having a precedence level substantially equivalent to the precedence level of the particular communication session are denied.

4. The method of claim 1, wherein the notification includes sending an SMS message to the third endpoint device.

5. The method of claim 1, wherein the notification includes causing an audible notification to be presented on the third endpoint device.

6. The method of claim 1, wherein the notification includes a voicemail accessible by the third endpoint device.

7. The method of claim 6, wherein the first communication session with the third end point device is automatically initiated by the first endpoint device.

8. The method of claim 6, wherein the first communication session with the first end point device is automatically initiated by the third endpoint device.

9. The method of claim 1, wherein the notification includes causing the attempted first communication session to be automatically established between the first endpoint device and third endpoint device upon conclusion of the particular communication session.

10. The method of claim 1, wherein the notification includes an option to automatically establish the attempted first communication session between the first endpoint device and third endpoint device.

11. The method of claim 10, wherein determining a particular precedence level of the first communication session includes determining whether the first communication session has an assigned precedence level.

12. The method of claim 1, further comprising:
    determining a particular precedence level of the first communication session.

13. The method of claim 1, wherein the precedence level of the particular communication session is a Multilevel Precedence and Preemption (MLPP) precedence level.

14. The method of claim 1, further comprising:
    identifying, during the particular communication session, an attempt by a fourth endpoint device to establish a second telephonic communication session between the fourth endpoint device and the first endpoint device;
    determining that the particular communication session has priority over the second communication session, wherein the attempt to establish the second communication session is denied based at least in part on the determination that the particular communication session has priority; and
    determining priority between the attempted first communication session and attempted second communication session, wherein the notification is provided to the second endpoint device based on the determined priority between the attempted first communication session and attempted second communication session.

15. The method of claim 14, wherein priority between the attempted first communication session and attempted second communication session is determined based at least in part on a comparison of precedence levels of the first and second communication sessions and a duration of time between the attempted first communication session and attempted second communication session.

16. Non-transitory media that includes computer code for execution and when executed by a processor is operable to perform operations comprising:
    identifying an attempt by a first endpoint device to establish a particular telephonic communication session with a second endpoint device during a first, preexisting telephonic communication session between at least the second endpoint device and a third endpoint device;
    comparing, by the second endpoint which includes a call manager, a precedence level of the attempted particular communication session with a precedence level of the preexisting first communication session;
    causing the first communication session to be terminated and the particular communication session to be established between the first endpoint device and second endpoint device based on a determination that the precedence level of the attempted particular communication session preempts the precedence level of the first communication session;
    identifying an end of the particular communication session; and
    providing a notification to the third endpoint device that the particular communication session has ended.

17. A system, comprising:
    at least one processor device;
    at least one memory element; and
    a call manager, wherein the system is configured for:
        identifying an attempt by a first endpoint device to establish a particular telephonic communication session with a second endpoint device during a first, preexisting telephonic communication session between at least the second endpoint device and a third endpoint device;
        determining, by the second endpoint which includes the call manager, that the first communication session has priority over the particular communication session, wherein the attempt to establish the particular communication session is denied based at least in part on the determination that the first communication session has priority;
        providing a notification to the first endpoint device that the particular communication session has ended; and
        comparing a precedence level of the particular telephonic communication session with a precedence level of the first telephonic communication session, wherein the precedence level of the particular communication session is higher than the precedence level of the first communication session.

18. The system of claim 17, wherein the call manager is remote from each of the first, second, and third endpoint devices.

\* \* \* \* \*